(12) United States Patent
Kainzner

(10) Patent No.: US 8,359,946 B2
(45) Date of Patent: Jan. 29, 2013

(54) BOWDEN CABLE ADJUSTING DEVICE AND MOUNTING PROCESS

(75) Inventor: Christoph Kainzner, Ramsau/Zillertal (AT)

(73) Assignee: AL-KO Kober AG, Kötz (DE)

( * ) Notice: Subject to any disclaimer, the term of this patent is extended or adjusted under 35 U.S.C. 154(b) by 1159 days.

(21) Appl. No.: 12/183,233

(22) Filed: Jul. 31, 2008

(65) Prior Publication Data

US 2009/0031845 A1 Feb. 5, 2009

(30) Foreign Application Priority Data

Aug. 1, 2007 (DE) .......................... 20 2007 010 787

(51) Int. Cl.
*F16C 1/22* (2006.01)

(52) U.S. Cl. ..................... 74/502.6; 74/500.5; 74/501.6; 188/196 R

(58) Field of Classification Search .................. 74/500.5, 74/501.5 R, 501.6, 502.4, 502.6; 188/196 D, 188/196 R, 2 D; 192/111.12; *F16C 1/22*
See application file for complete search history.

(56) References Cited

U.S. PATENT DOCUMENTS

| 4,379,500 | A | * | 4/1983 | Kamino | 188/196 B |
| 5,015,023 | A | * | 5/1991 | Hall | 294/102.1 |
| 5,709,287 | A | * | 1/1998 | Bochman | 188/196 B |
| 5,813,290 | A | * | 9/1998 | Takahashi et al. | 74/501.5 R |
| 5,910,194 | A | * | 6/1999 | Cho | 74/500.5 |
| 5,950,496 | A | * | 9/1999 | Rampp | 74/538 |
| 6,305,238 | B1 | * | 10/2001 | Gabas | 74/502.6 |
| 2003/0075000 | A1 | * | 4/2003 | Grundke | 74/501.5 R |
| 2008/0134828 | A1 | * | 6/2008 | Lee et al. | 74/501.6 |
| 2011/0030497 | A1 | * | 2/2011 | Djordjevic | 74/501.5 R |

FOREIGN PATENT DOCUMENTS

| DE | 34 35 912 | 4/1986 |
| DE | 196 18 422 | 5/1997 |
| DE | 198 36 703 | 3/2000 |
| DE | 101 27 630 | 2/2002 |
| DE | 100 53 677 | 5/2002 |
| DE | 101 12 059 | 11/2002 |
| DE | 101 35 359 | 1/2003 |
| DE | 103 34 224 | 2/2005 |

* cited by examiner

*Primary Examiner* — Richard W Ridley
*Assistant Examiner* — Thomas Diaz
(74) *Attorney, Agent, or Firm* — McGlew and Tuttle, P.C.

(57) ABSTRACT

A Bowden cable adjusting device is provided for one or more Bowden cables (1', 1"). The Bowden cable adjusting device (3) has a housing (4) with a detachable locking device (6) for adjustably connecting the housing (4) to a transmission element (5), which can be connected to one or more Bowden cables (1', 1"). The Bowden cable adjusting device (3) has a mounting securing device (7) for the transmission element (5). The mounting securing device (7) can be deactivated. A process for mounting and adjusting a Bowden cable arrangement is also provided, wherein the mounting securing device (7) may be deactivated and the Bowden cable adjusting device (3) is shortened while adjusting the distance between the actuating member (2) and the Bowden cable (1', 1").

20 Claims, 9 Drawing Sheets

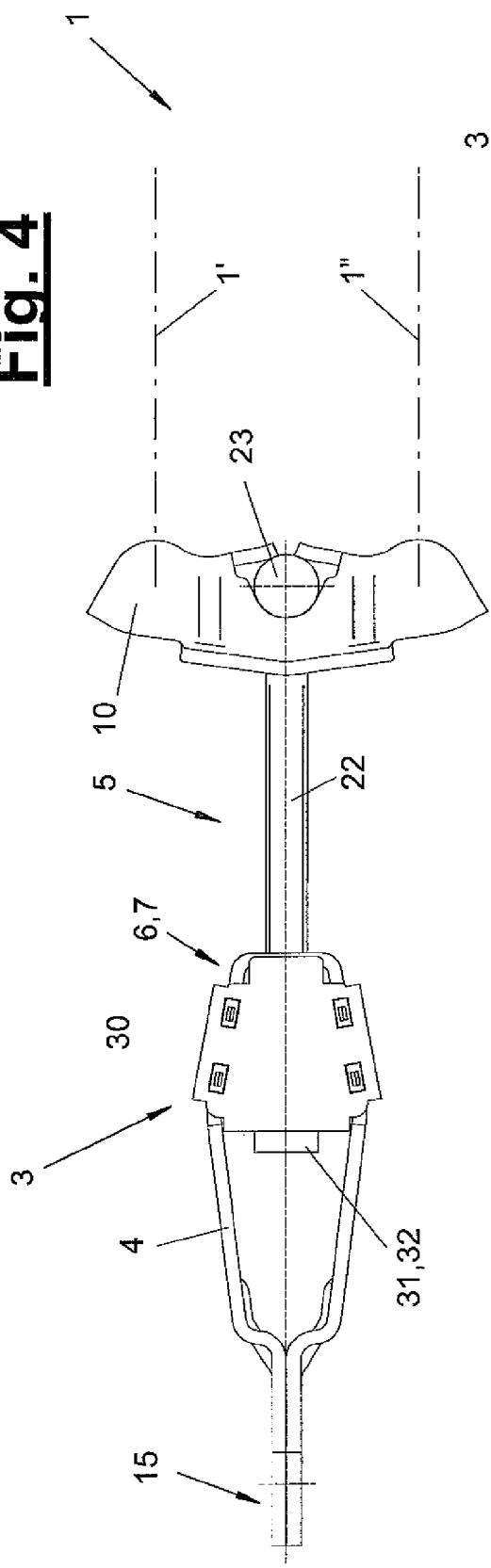
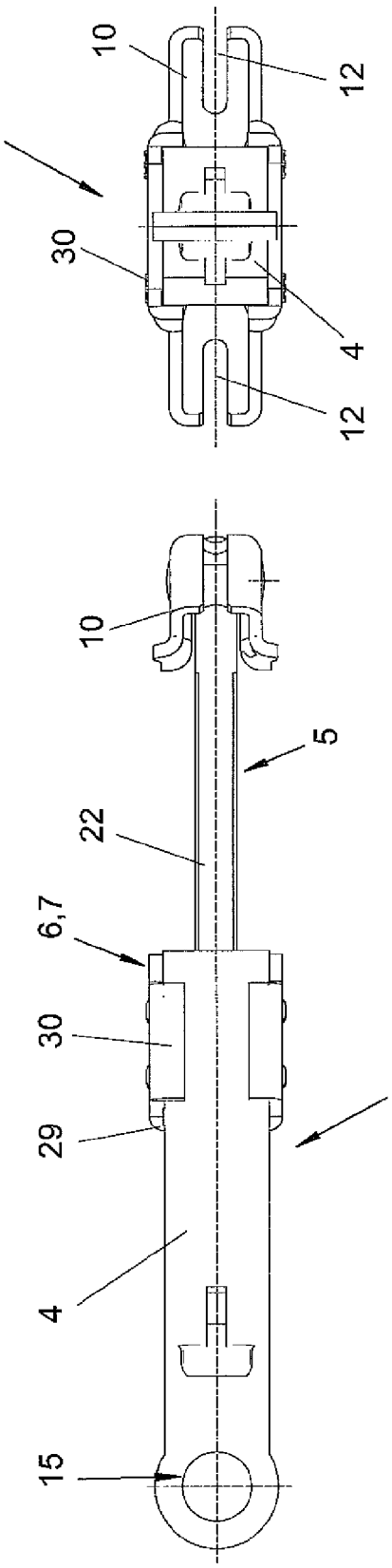

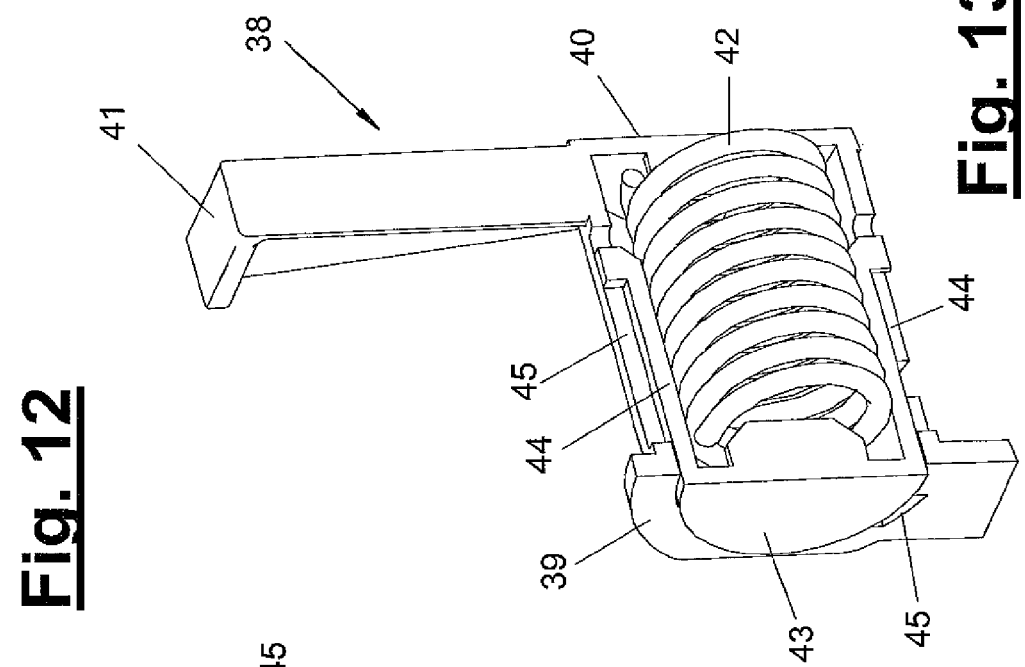
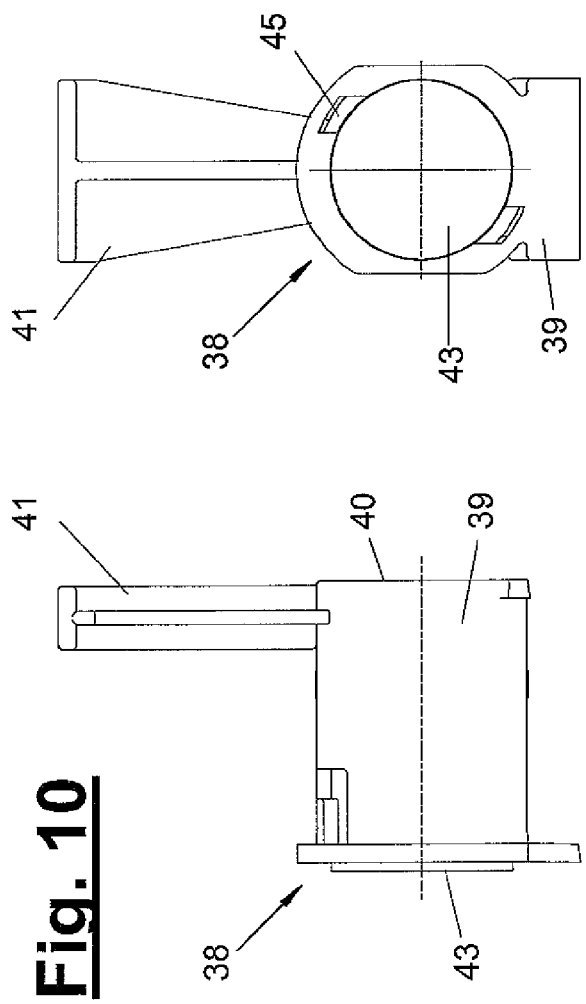
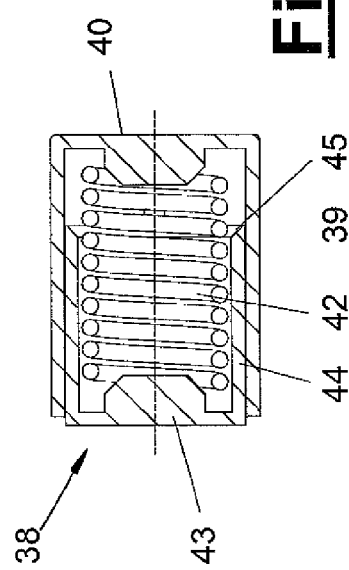

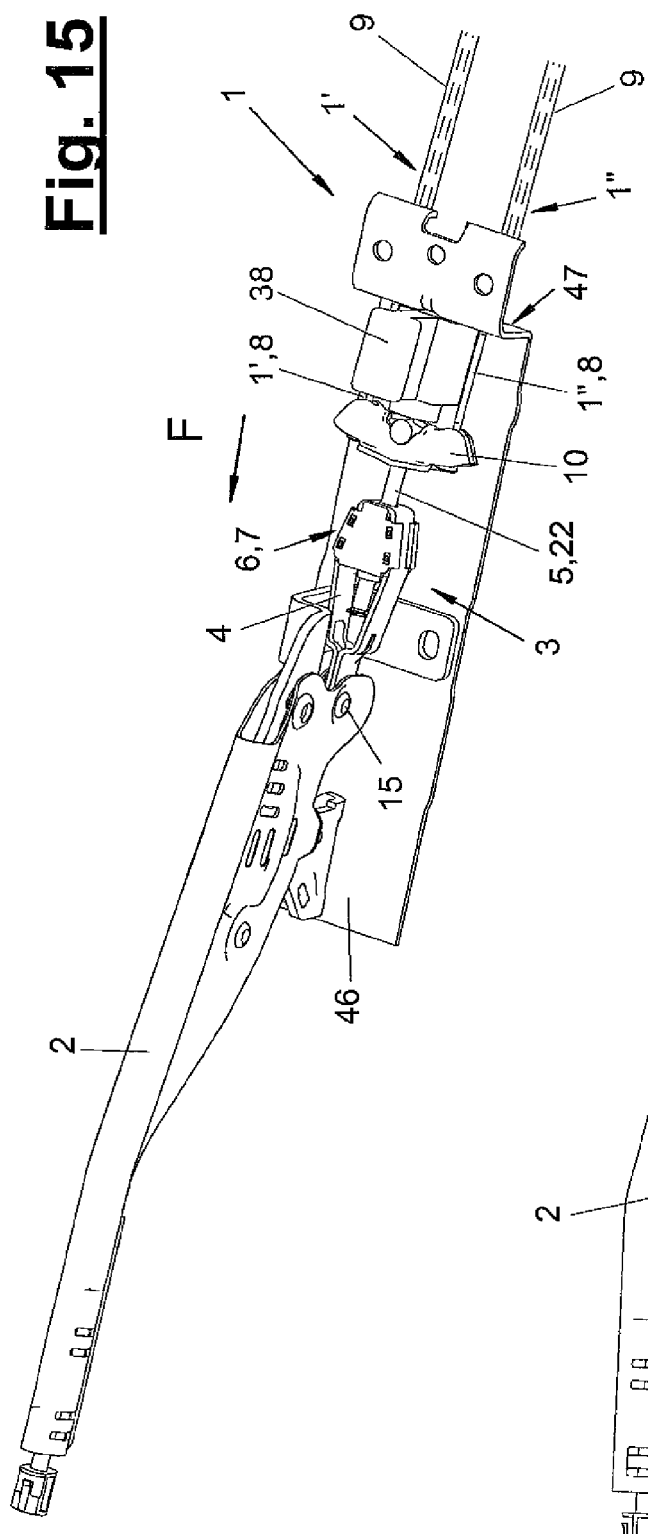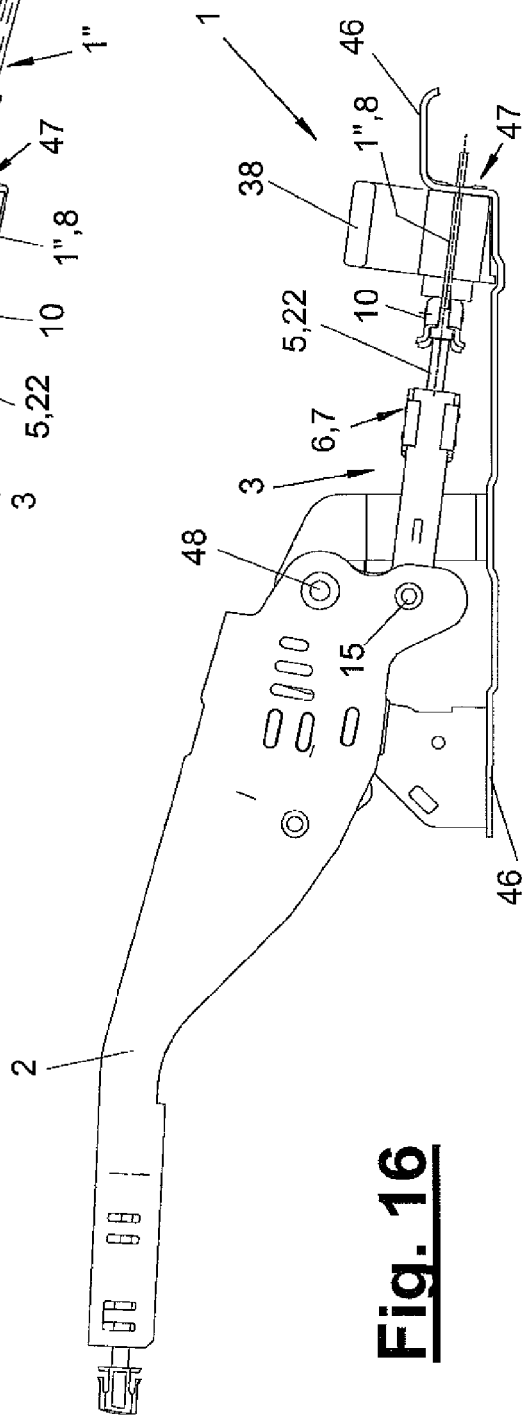

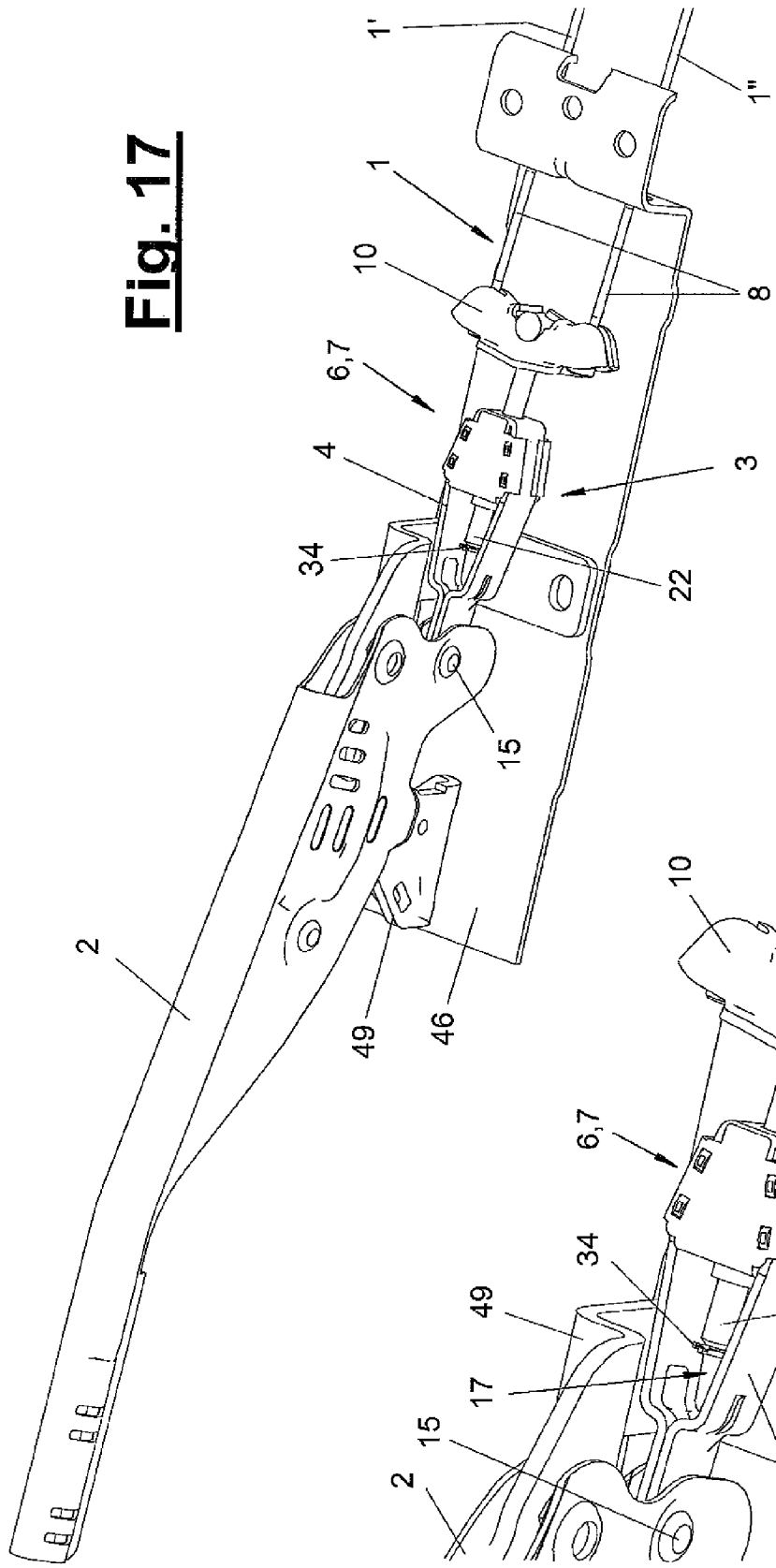
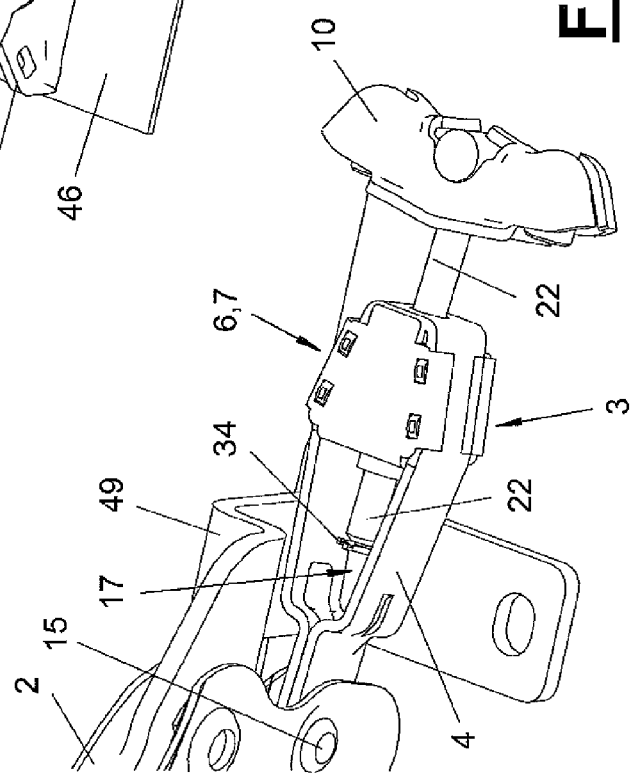

BOWDEN CABLE ADJUSTING DEVICE AND MOUNTING PROCESS

CROSS REFERENCE TO RELATED APPLICATIONS

This application claims the benefit of priority under 35 U.S.C. §119 of German Utility Model 20 2007 010 787.0 filed Aug. 1, 2007, the entire contents of which are incorporated herein by reference.

FIELD OF THE INVENTION

The present invention pertains to a Bowden cable adjusting device for one or more Bowden cables and a mounting process for mounting and adjusting a Bowden cable arrangement.

BACKGROUND OF THE INVENTION

Bowden cables are adjusted in practice by adjusting the Bowden cable sheath at the point of attachment. This is a manual adjustment.

Furthermore, it is known that to compensate wear, Bowden cables can be provided with an automatic Bowden cable adjusting device, in which the cable is restretched by means of a spring with the Bowden cable released.

SUMMARY OF THE INVENTION

The object of the present invention is to show an improved Bowden cable adjusting device.

The mounting process and the Bowden cable adjusting device with the mounting securing means have the advantage that the Bowden cable adjusting device and the Bowden cable arrangement always have the same, defined configuration for mounting the Bowden cable and for putting into operation. This simplifies and facilitates the mounting and handling of the Bowden cable adjusting device. In addition, the mounting securing means prevents the Bowden cable adjusting device from being adjusted in an undesired manner during transportation or on other occasions. The design of the transmission element with means securing against rotation also counteract such an adjustment.

The mounting process makes it possible to connect an actuating member and one or more Bowden cables in a rapid and simple operation and to set the Bowden cable arrangement, which is closed hereby. The correct distance between the actuating member and the Bowden cables is set now. The use of a mounting tool makes it possible to hold the Bowden cable or the Bowden cables in the correct stretched position. Adjustment of the Bowden cable arrangement is possible by simply using the actuating member.

The mounting securing means can be overcome and deactivated in a simple manner for mounting and putting into operation. Removal of securing parts is not necessary now. It is sufficient to stationarily support the transmission element with the mounting tool and to deactivate the mounting securing means by actuating an adjusting member, e.g., a hand brake lever, by removing, e.g., breaking off or breaking into pieces the support element. The support element can be discarded and disposed of in a simple manner. As an alternative, it may remain at the transmission element. The circumstance that functional parts of the Bowden cable according to the present invention, which are needed anyway, can be used for the mounting securing means and maintain their function after removal of the support element is advantageous here as well.

The support element with its predetermined breaking elements, e.g., one or more weakened areas of the wall, can be broken off by the force of the hand and by the adjusting force during the actuation of the hand brake lever. The force needed to break off the mounting securing means is weaker due to the predetermined breaking elements than the force needed for adjusting or the force of the hand. No other tools are necessary for mounting and putting into operation the Bowden cable adjusting device and the Bowden cable arrangement aside from the mounting tool, which can have only a supporting function for the transmission element during the engagement of the hand brake lever. The preferred design embodiment of the Bowden cable adjusting device with the housing, locking means and transmission element is also advantageous. The embodiment being claimed requires only a low design effort and is especially cost-effective and reliable in operation. In addition, there is a high level of trouble-free operation.

The present invention is shown schematically in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a tilted view of the Bowden cable adjusting device;

FIG. 5 is another tilted view of the Bowden cable adjusting device;

FIG. 6 is another tilted view of the Bowden cable adjusting device;

FIG. 10 is a side view showing a mounting tool;

FIG. 11 is a sectional view showing the mounting tool;

FIG. 12 is an end view showing the mounting tool;

FIG. 13 is a perspective view showing the mounting tool;

FIG. 15 is a perspective view showing the Bowden cable arrangement according to FIG. 14 after putting into operation and after the mounting securing means has been overcome;

FIG. 16 is a side view showing the Bowden cable arrangement according to FIG. 14 after putting into operation and after the mounting securing means has been overcome;

FIG. 17 is a perspective view showing the Bowden cable arrangement according to FIG. 14 after putting into operation and after the mounting securing means has been overcome; and FIG. 18 is an enlarged and cut-away view of the Bowden cable adjusting device according to FIG. 17.

DESCRIPTION OF THE PREFERRED EMBODIMENTS

Figure 1:
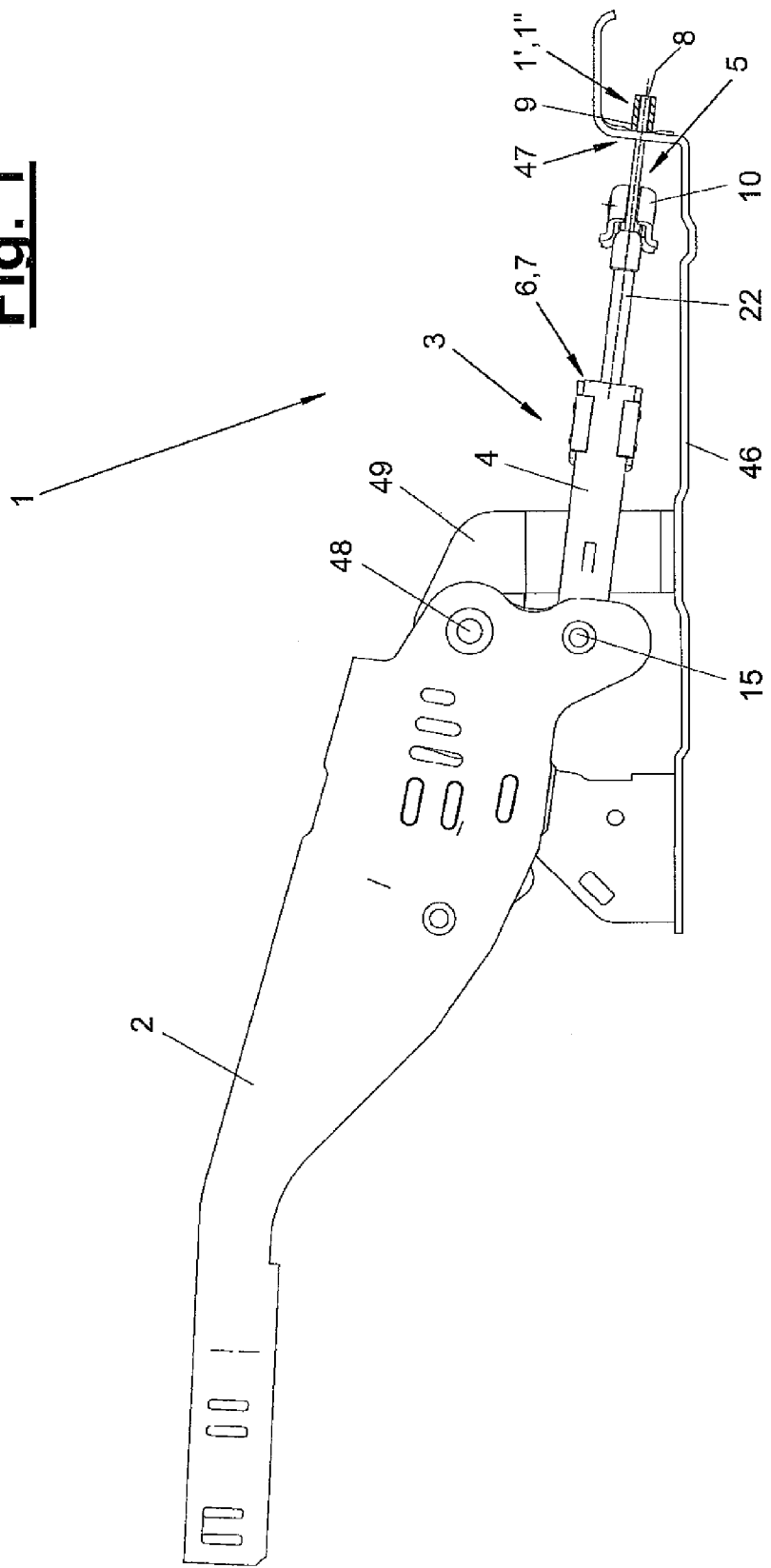
FIG. 1 is a side view showing a Bowden cable arrangement with a hand brake lever, a Bowden cable adjusting device and a mounting securing means before putting into operation.
Figure 2:
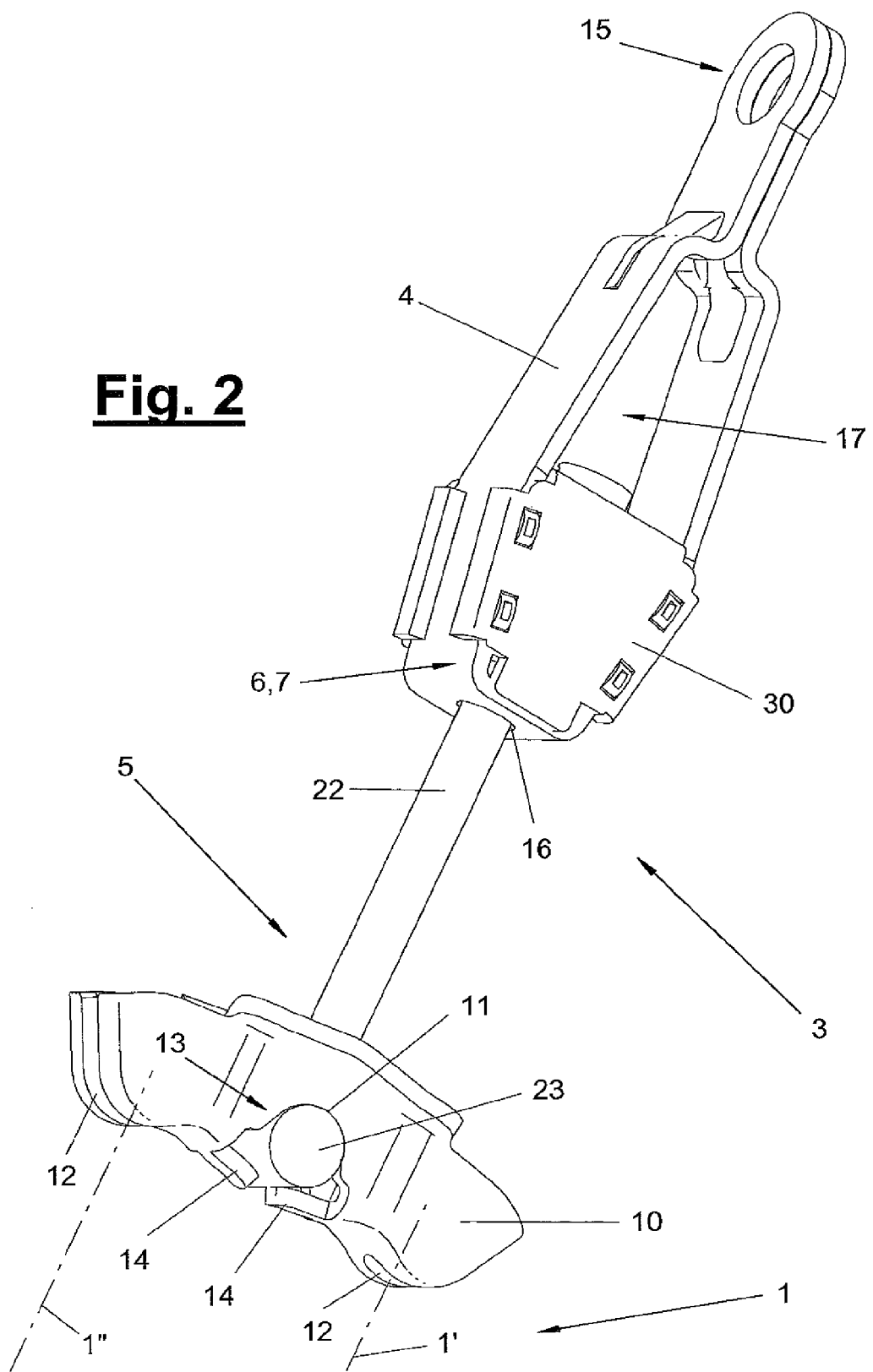
FIG. 2 is a perspective view of a Bowden cable adjusting device.

Referring to the drawings in particular, the present invention pertains to a Bowden cable adjusting device (3) for a Bowden cable arrangement (1) with one or more Bowden cables (1', 1"). The present invention pertains, furthermore, to an adjusting or mounting process, to the Bowden cable arrangement (1) and to a vehicle equipped therewith.

FIG. 1 shows a side view of a Bowden cable arrangement (1) before putting into operation. In the embodiment being shown, the Bowden cable arrangement (1) has two parallel Bowden cables (1', 1"), which have an inner tensile cable (8) and a surrounding sheath (9) each. The number of Bowden cables (1', 1") may vary and be fewer or more than two. The Bowden cables (1', 1") are connected to an actuating member (2) by means of a Bowden cable adjusting device (3).

At the beginning, the actuating member (2) and the Bowden cables (1', 1") are arranged separated and at spaced locations from one another. During mounting, they are connected to one another and subsequently brought to the correct distance or length. To mount the Bowden cable arrangement (1), the Bowden cable adjusting device (3), which is provided with an activated mounting securing means (7) and as a result has a predetermined length, is inserted between the actuating member (2) and the Bowden cables (1', 1") and is connected to the actuating member (2), on the one hand, and to the Bowden cables (1', 1"), on the other hand. The Bowden cable adjusting device (3) has an excess length, which simplifies mounting. The Bowden cable arrangement (1) is then adjusted to the correct length by the mounting securing means (7) being deactivated and the Bowden cable adjusting device (3) being shortened. The distance between the actuating member (2) and the positioned and optionally somewhat pre-stressed Bowden cables (1', 1") is also shortened now and adjusted to the correct measurement.

The actuating member (2) may be, e.g., the hand brake lever being shown, which is articulated to a lever frame (49) in such a way that it is pivotable about a lever axis (48) and is coupled to the Bowden cable adjusting device (3) and, furthermore, to the Bowden cables (1', 1") by means of a connection (15). The hand brake lever (2) may have any desired and suitable design and shape and may have, in particular, a catch arrangement with a toothed quadrant and a releasing means herefor in the grip part in the front. The lever frame (49) is arranged on a mounting frame (46), with which the entire Bowden cable arrangement (1) can be mounted in a vehicle (not shown). The arrangement may be part of a brake means, especially of a parking brake means. Any other adjusting elements may otherwise be actuated with the Bowden cables (1', 1") as well.

As an alternative, the actuating member (2) may be another Bowden cable, a power transmission linkage, a pedal or the like. Furthermore, the Bowden cable adjusting device (3) may be integrated in a Bowden cable and arranged, e.g., at a spaced location from a hand brake lever or another actuating member.

The mounting frame (46) may have any desired design. In the embodiment being shown, it is plate-shaped or tub-shaped and has, at the rear end, a step or bevel, which offers, on the one hand, a ducting in the upright web area for the one or more Bowden cables (1', 1"). On the other hand, the step forms a relatively stationary support (47) for a mounting tool (38), which will be explained below.

The Bowden cable adjusting device (3) and the mounting securing means (7) may have any desired and suitable design for carrying out the aforementioned mounting and adjusting process. An exemplary embodiment is shown for this in the drawings and in the following description.

The Bowden cable adjusting device (3) has a housing (4) with a detachable locking means (6) for adjustably connecting the housing (4) to a transmission element (5). The housing (4) may be connected on the front side to the actuating member (2) or the hand brake lever via a connection (15), e.g., a hinge. The transmission element (5) may be connected to the one or more Bowden cables (1', 1") and especially to the cables (8) thereof. The one or more Bowden cables (1', 1") are adjusted and stretched due to the variable depth of immersion of the transmission element (5) in the housing (4). The detachable locking means (6) is provided to change and set the depth of immersion.

The Bowden cable adjusting device (3) has, in addition, the mounting securing means (7) for the transmission element (5), which can be removed, released or deactivated in another manner. The intact or activated mounting securing means (7) supports the transmission element (5) at the housing (4) in a predetermined position before mounting and putting into operation and holds the transmission element (5) in this position. In addition, the mounting securing means (7) guides the transmission element (5). The locked transmission element (5) projects from the housing in the rearward direction by a certain amount, as a result of which the Bowden cable adjusting device (3) has the predetermined length.

The mounting securing means (7) has, e.g., a limited mechanical load-bearing capacity and yields at a triggering load or breaking load F, while the transmission element (5) is released and can dip into the housing (4) to stretch and adjust the Bowden cables (1', 1"). The breaking load F or the adjusting force or hand force applied herefor is greater than the force needed for breaking off the mounting securing means (7). No other tool is needed besides the mounting tool (38) to overcome the mounting securing means (7).

The mounting securing means (7) is arranged in housing (4) and can be coupled to the locking means (6) and one of the functional parts thereof. The mounting securing means (7) fixes the transmission element (5) with a support element (34) in a predetermined position and supports same. The transmission element (5) dips into the housing (4) over a short section only in this starting position and projects outwardly by a corresponding amount.

The Bowden cable adjusting device (3) is mechanically stabilized in this starting position with intact or activated mounting securing means (7). It forms an assembly unit, which is defined in terms of its dimensions, especially its length, and can be handled and transported without problems. The stable shape of the Bowden cable adjusting device (3) also makes possible the simple and reliable mounting and installation as a connection member between the actuating member (2) and the Bowden cables (1', 1"). The length of the stabilized Bowden cable adjusting device (3) is selected to be such that it can be connected at its ends to the actuating member (2) and to the Bowden cables (1', 1") without forcing.

The support element (34) has one or more predetermined breaking elements (36), which may be designed in any desired and suitable manner, e.g., as weakened areas of the wall, and which break off or yield in another manner and become detached when the breaking force F or adjusting force is applied. The support element (34) can now be detached from its connection to other parts and removed. As an alternative, it may also be destroyed. Various possibilities of embodiment are available for embodying the mounting securing means (7) and the parts thereof.

The transmission element (5) may have various designs. In the embodiment being shown, it comprises at least one pulling element (22), which can transmit pulling and pushing forces, and is designed, for example, as a rod. At the rear end, the pulling element (22) may be connected to one or more Bowden cables (1', 1") in a rigid or detachable manner in any desired and suitable manner. In particular, the pulling element (22) may be connected directly to an individual Bowden cable.

In the embodiment being shown, a compensating element (10) is arranged preferably centrally at the end of the rod in an articulated manner, and one or more Bowden cables (1', 1") may be mounted on and, e.g., hung into the compensating element (10) on both sides and preferably symmetrically to the axis of the rod. The compensating element (10) may have a strap-like design for this and have a central rod mount (11) with a positive-locking roller cup and with an axial passage opening. A thickened connection element (23) can be accommodated in the cup or trough at the rear end of the rod in a positive-locking manner and guided pivotably. The connection element (23) may be designed, e.g., as a cylinder-like hammer head, which is made integrally in one piece and is accommodated in the elongated trough or cup. A means securing against rotation (13), which prevents the tie rod (22) from rotating about its longitudinal axis, is formed by this mount. The tie rod is mounted from the rear side of the compensating strap (10). The access opening can first be opened here by means of wing-like position securing means (14) and then reclosed. The position securing means (14) holds the connection element (23) in contact with the rod mount (11).

The compensating strap (10) has two or more cable mounts (12), which are designed, e.g., as transversely running slots in the beveled compensating strap (10) and make it possible to insert the cables (8) into the slots, which are open on the side, and to hang the thickened nipples or cable heads, which are located at the end of the cable, into the strap change surrounding the slot in a positive-locking manner.

The pulling element (22) has a locking profile (27) on one or more outer sides at least in the front area, but alternatively also over the entire length. This is used to form a positive-locking locking mechanism for transmitting tensile and pushing forces in the locking means (6). The locking profile (27) may have any desired and suitable design as a screw thread or thread profile, as a ring-shaped wave profile or in another desired manner.

Figure 3:
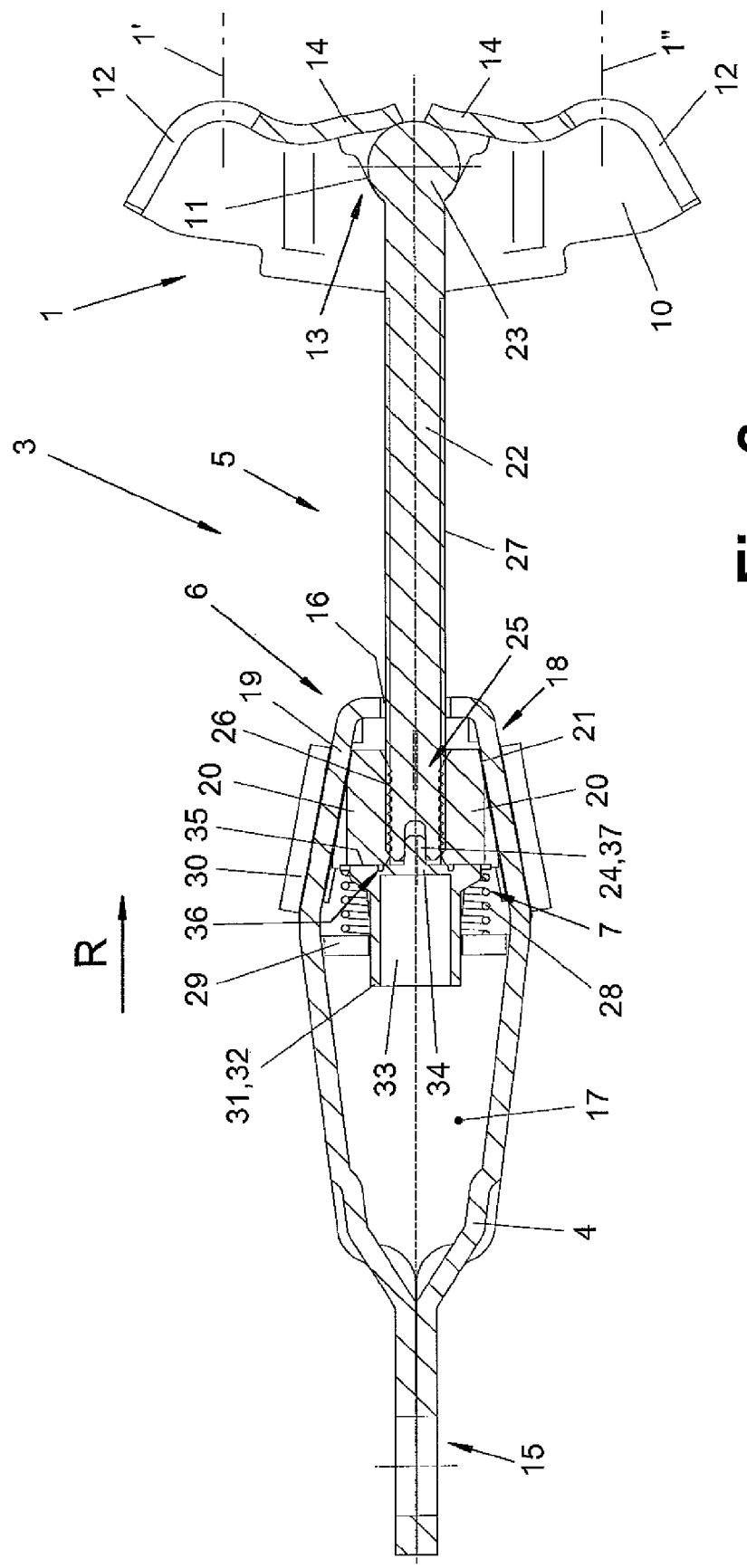
FIG. 3 is a longitudinal sectional view through a Bowden cable adjusting device.
Figure 7:
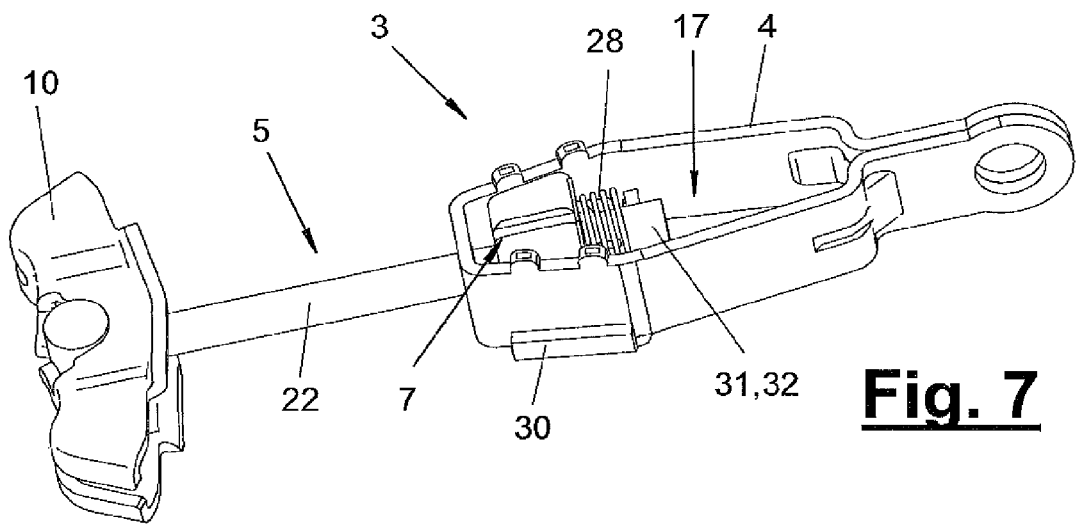
FIG. 7 is a perspective view showing an opened Bowden cable adjusting device with a mounting securing means.
Figure 8:
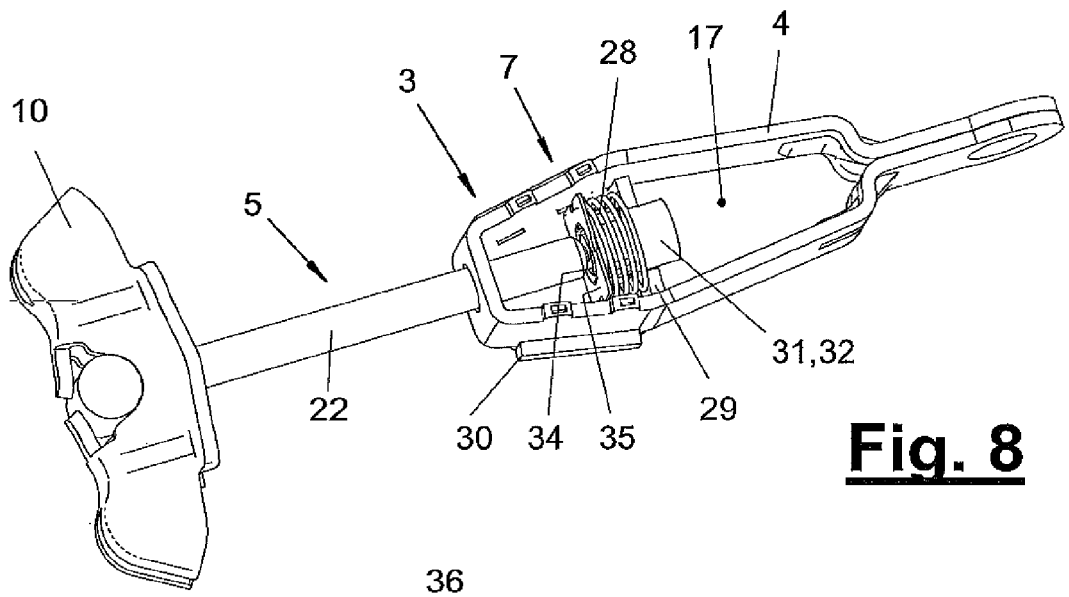
FIG. 8 is another perspective view showing an opened Bowden cable adjusting device with a mounting securing means.

In addition, a connection part (24), which cooperates with an opposing connection part (37) at the mounting securing means (7), especially at the support element (34), may be located at the front end of the rod. The connection parts (24, 37) may be designed in any desired and suitable kinematic assignment as an axial pin or bolt with a corresponding mounting opening for a positive-locking plug-type connection. The pin and hole pairing may be cylindrical or conical, and, e.g., a clamping cone is formed, by which the support element (34) is held at the pulling element (22) after breaking off. The pulling element (22) can also be centered in the housing (4) in the starting position by means of this guide. This arrangement is shown in FIG. 3.

In the embodiment shown, the support element (34) and the pulling element (22) are separate parts and are connected detachably to one another. There also may be a durable connection, e.g., by the above-mentioned clamping cone, which holds the support element (34) at the pulling element (22) after breaking off. Furthermore, the support element (34) and the pulling element (22) may be connected in one piece to form a joint part. The securing part (31) may also be included in the one-part connection.

The locking means (6) has, within the housing (4), one or more locking elements (20), which are movable against a restoring force R along and at right angles to the pulling element (22) and have, on the inner side, a locking profile (26), which forms the opposing profile (27) at the pulling element (22).

The locking means (6) may have, e.g., an individual locking element (20) in the form of an elastically deformable conical ring, which is arranged displaceably on the, e.g., cylindrical transmission element (5) or pulling element (22) and whose radial deformability is achieved by longitudinal slots or in another manner. As an alternative, two, three or more locking elements (20) may be present, e.g., in the form of conical ring segments, which surround on the circumference a transmission element (5) or pulling element (22), which has a round or oval cross section, and they are guided by the ring arrangement in the circumferential direction. In another variant, one or more locking elements (20) may be present in the form of cone strips, which are optionally guided at the housing (4), and, e.g., two cone strips are located diametrically opposite each other at the transmission element (5) or the pulling element (22). The locking means (6) and the one or more locking elements (20) may otherwise have any other desired and suitable shape and arrangement.

The locking elements (20) may be moved towards or away from the pulling element (22) to close and open the locking mechanism (25). In the closed position of the locking mechanism (25) and in the meshing position of the locking profiles (26, 27), tensile forces can be transmitted from the connection (15) via the housing (4) and the locking elements (20) fixed therein to the tie rod (22) and farther to the attached Bowden cables (1', 1"). To open the locking mechanism (25), the pulling element (22) can be moved towards the housing (4), when the locking elements (20) are carried by the locking mechanism (25), which is at first closed, against the restoring force R in the longitudinal direction and are released from meshing with the profile after a short path by a transverse motion. The pulling element (22) can dip deeper into the housing (4) in this released position, the housing making a free space or adjusting space (17) available for this.

A clamping guide (18) is present to control the motions of the locking element or locking elements (20). This guide has, e.g., in the range of motion of the one or more locking elements (20), a conical wall (19) each at the housing (4). This [wall] cooperates with a correspondingly directed wedge surface (21) on the outer side of the locking elements (20). The walls (19) and the wedge surfaces (21) taper rearwardly in the direction of the Bowden cables (1', 1") and generate a wedge effect, which is directed towards the transmission element (5) and which presses the locking elements (20) onto the pulling element (22) in the closing position shown in FIG. 3 and closes the locking mechanism (25). The locking elements (20) are supported on the housing (4) in this closing position via their wedge surfaces (21) and transmit the tensile forces to the pulling element (22) while securing the meshing position. The locking elements (20) can move away from the pulling element (22) due to the opening wedge shape during a motion of the tie rod in the opposite direction.

The restoring force R directed towards the Bowden cables (1', 1") can be brought about by an adjusting element (28), which may have any desired design. In the exemplary embodiment being shown, it is a compression spring, especially a coil spring, which is supported towards the front at the housing (4) in a suitable manner, e.g., at the inwardly extending support parts (29) located there, which are formed, for example, by a cover (30), which will be explained below. The spring (28) can be supported in the forward direction at the locking elements (20) directly or via the intermediary of a spring mount (32). The spring mount (32) may have a flat, broad rearward support wall (35) for reliably transmitting the spring forces and for contact with the likewise flat front wall of the locking elements (20), which contact is favorable for guiding. FIG. 3 shows this arrangement and the accommodation of the locking means (6) formed hereby at the rear part of the housing (4).

The housing (4) may have any desired and suitable design. On the front side, it has the connection (15) for coupling with the hand brake lever (2). A passage opening (16) for the pulling element (22) is present on the rear side. The housing (4) has a clip-shaped design in the embodiment being shown and may be embodied as a punched and bent metallic part. The housing walls are close to each other in the area of connection (15). Farther to the rear, they move apart, forming a free space (17), and also have the conical wall (19) at the front end. The housing (4) may be open on one or two sides and form a kind of cuff. A cover (30) is present for the locking means (6) in the rear area. This is shown in different views in FIGS. 4 through 6 and may be of a strap-like design. The support walls (29) projecting inwardly into the free space (17) may be made integrally in one piece at the front end of the strap. As a result, a space, which is closed essentially on all sides, is formed as a result in the rear area of the housing for accommodating the locking means (6) and the mounting securing means (7).

In the embodiment shown in FIGS. 3 and 7 through 9, the mounting securing means (7) has a securing part (31) with the support element (34). The securing part (31) may have a sleeve-shaped design and be a functional part of the locking means (6). In the embodiment being shown, it forms a mounting sleeve (32) for the coil spring (28) pulled up on the outside. This spring mount (32) has an inner passage opening (33), which makes possible the passage of the pulling element (22) after putting into operation. The mounting sleeve (32) passes with its front end through an opening between the support walls (29) and may have, at its rear end, a wedge-shaped thickening in the wall, which can be used as a spring support and offers a flat contact surface (35) for the locking elements (20).

Figure 9:
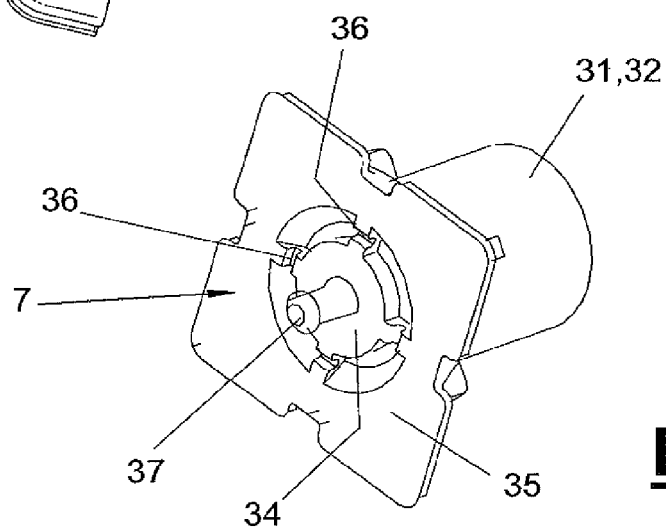
FIG. 9 is an enlarged view of a securing part with a support element of the mounting securing means.

The passage opening (33) of the mounting sleeve (32) is closed on the end side by the support element (34), which forms a transversely extending wall and the bottom of the sleeve. FIGS. 3 and 9 also show the weakened areas (36) of the wall, which are designed, e.g., as notches at narrow radial webs. A plurality of radial webs, e.g., four, connect the support element (34) to the wall of the sleeve. Support element (34) has a smaller diameter than the passage opening (33) and can pass through same after braking off.

FIGS. 10 through 13 show the mounting tool (38). This has a dimensionally stable housing (39), which can absorb and transmit compressive forces. A pressure piston (43) is guided in the housing (39) longitudinally movably via a pushing guide (44) and it projects somewhat from the housing opening in the forward direction. The pressure piston may be pot-shaped and accommodate on the inside a spring (42), which loads same in the push-out direction. The force of spring (42) is greater than that of spring (28) in the locking means (6). The push-out path for the pressure piston (43) is limited. A bayonet catch (45) facilitates the mounting of the piston, and two or more projections, which can dip into front-side grooves at the edge of the housing opening, are arranged on the wall of the pot on the outer side. After a rotation, the pressure piston (43) can be snapped into the pushing guide (44) and it can then perform the necessary axial motions. Furthermore, a grip part (41) may be arranged at the housing (40).

Figure 14:
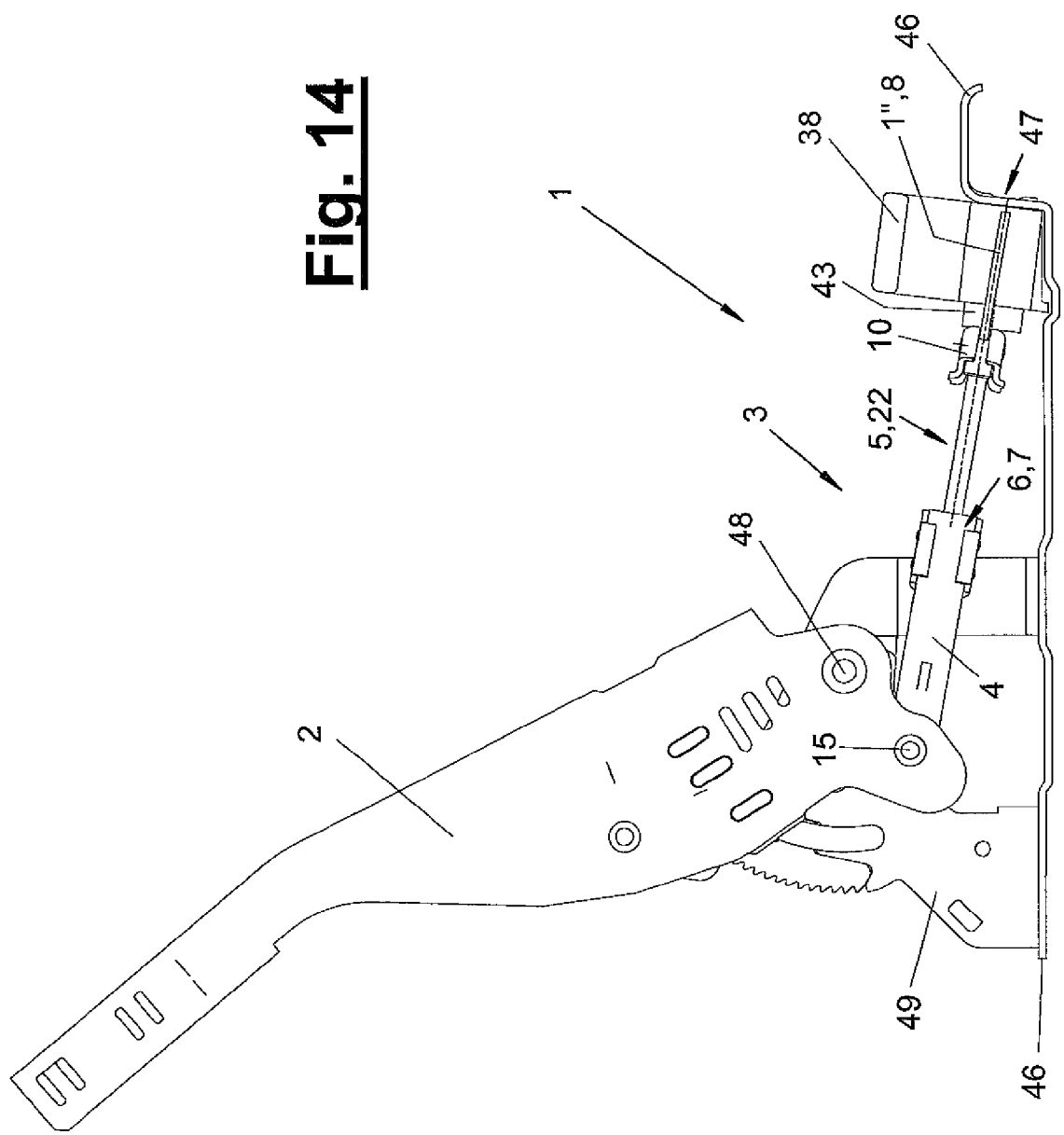
FIG. 14 is a lateral side view showing the Bowden cable arrangement with the hand brake lever and the mounting tool used before putting into operation.

FIG. 14 illustrates the starting position of the Bowden cable arrangement (1) before the Bowden cable adjusting device (3) is mounted and put into operation. The Bowden cables (1', 1") are hung into the compensating element (10), the hand brake lever (2) is stretched or pulled and projects upward, and the compensating element (10) being carried has a sufficient distance from the rear wall of the mounting frame (46). The mounting tool (38) can be temporarily inserted into this free space between the Bowden cables (1', 1") or cables (8) and come into contact on the rear side with the support (47) of the step of the frame. The spring-loaded pressure piston (43) can be pushed back for insertion and will then be in contact with the compensating element (10). The arrangement is essentially free from clearance in this position.

The hand brake lever (2) is subsequently released and pivoted downward into the position shown in FIGS. 15 through 17. Via connection (15), housing (4) with the support part (29) and with the spring (28), which is completely compressed, is pushed now to the rear via the mounting sleeve (32) and against the tie rod (22) fixed by the mounting tool (38). This leads to deactivation of the mounting securing means (7). The support element (34) is pressed by the motion of the lever against the stationary tie rod (22) being supported at the mounting tool (38) and broken off when a sufficient adjusting force or breaking force F is reached. As a result, housing (4) can be pushed farther via the tie rod (22), and the locking means (6) is released by the relative motion between the housing (4) and the tie rod (22) as well as by the compression of spring (28), and the pulling element (22) dips into the free space (17) through the securing part (31), carrying the broken-off support element (34).

After the mounting securing means (7) has been deactivated or broken off, the compressed spring (28) can again be released, and it pushes the locking elements (20) into the clamping guide (18) and causes them to again mesh with the tie rod (22). The locking mechanism (25) is closed and the tie rod (22) is locked in its new axial position. The cables (8) are kept stretched by the mounting tool (38), so that the Bowden cable adjusting device (3) and the Bowden cables (1', 1") are adjusted correctly after the mounting securing means (7) has been broken off and the tie rod has been locked in the end position according to FIG. 17.

The hand brake lever (2) can now be pivoted upward again, while the Bowden cables (1', 1") are stretched while carrying the compensating element (10). The released mounting tool (38) can be removed, and the Bowden cable arrangement is ready to operate.

If the Bowden cables (1', 1") become slack, this can be compensated with the Bowden cable adjusting device (3) in a corresponding manner, as at the time the means is put into operation for the first time. With the hand brake lever (2) pulled, the mounting tool (38) is inserted, and it presses the compensating element (10) forward with its pressure piston (43), which is extending under the force of the spring, and the slack of the cable is taken up. When the hand brake lever (2) is subsequently pivoted down, the locking means (6) is released and the tie rod (22) being supported at the mounting tool (38) is inserted deeper into the housing (4) corresponding to the taking up of the slack. After pulling the hand brake lever (2) again while closing the locking means (6) and carrying the compensating element (10), the mounting tool (38) can be removed and the slack-compensated Bowden cable arrangement (1) is again ready to operate.

Various modifications of the embodiments shown and described are possible. The design of the Bowden cable adjusting device (3) may be varied. This also applies to the mounting securing means (7). Support element (34) may be located in another location or at the housing (4) and may be arranged, for example, at the front end of the mounting sleeve (32). Furthermore, the compensating element (10) may be eliminated and an individual Bowden cable may be connected to the pulling element (22) directly in a corresponding, suitable manner. The mounting tool (38) is correspondingly adapted to this changed shape in order to make it possible to support this connection location by the Bowden cable adjusting device (3) for putting into operation or for taking up slack. Furthermore, the individual features of the different components of the exemplary embodiments described can be replaced and/or combined with one another as desired.

While specific embodiments of the invention have been shown and described in detail to illustrate the application of the principles of the invention, it will be understood that the invention may be embodied otherwise without departing from such principles.

LIST OF REFERENCE NUMBERS

1 Bowden cable arrangement
1' Bowden cable
1" Bowden cable
2 Actuating member, hand brake lever
3 Bowden cable adjusting device
4 Housing, clamp
5 Transmission element
6 Locking means
7 Mounting securing means
8 Cable
9 Sheath
10 Compensating element, compensating strap
11 Rod mount
12 Cable mount
13 Means securing against rotation
14 Position securing means, wing
15 Connection
16 Passage opening
17 Free space, adjusting space
18 Clamping guide
19 Conical wall
20 Locking element
21 Wedge surface
22 Pulling element, tie rod
23 Connection element, hammer head
24 Connection part, hole
25 Locking mechanism
26 Locking profile
27 Locking profile
28 Adjusting element, spring, coil spring
29 Support part, support wall
30 Cover, strap
31 Securing part
32 Spring mount, mounting sleeve
33 Passage opening
34 Support element
35 Wall
36 Predetermined breaking element, weakened area of wall
37 Connection part, pin
38 Mounting tool
39 Housing
40 Housing wall, rear wall
41 Grip part
42 Spring
43 Pressure piston
44 Pushing guide
45 Quick-acting closure, bayonet catch
46 Mounting frame, mounting tub
47 Support
48 Lever axis
49 Lever frame
F Breaking force
R Restoring force

What is claimed is:

1. A Bowden cable adjusting device for one or more Bowden cables, the device comprising:
a transmission element for connection to the one or more Bowden cables;
a housing with a detachable locking means for adjustably connecting the housing to said transmission element wherein said locking means has one or more locking elements with a locking profile movable in said housing against a restoring force, said locking elements being caused to mesh with a locking profile of said transmission element; and
a mounting securing means for mounting and securing the transmission element, said mounting securing means being arranged in said housing and supported by said housing, said mounting securing means having a support element for supporting said transmission element, said support element being provided with at least one predetermined breaking element comprising a wall with a weakened wall area that is weakened relative to an adjacent wall area, said mounting securing means being deactivatable while adjusting a distance between an actuating member and said one or more Bowden cables, wherein said weakened wall area comprises a groove to provide a groove region with reduced wall material compared to said adjacent wall area.

2. A Bowden cable adjusting device in accordance with claim 1, wherein the mounting securing means supports and holds the transmission element at said housing in a predetermined position.

3. A Bowden cable adjusting device in accordance with claim 2, wherein said mounting securing means guides said transmission element.

4. A Bowden cable adjusting device in accordance with claim 2, wherein said mounting securing means has a limited mechanical load-bearing capacity and yields at a breaking load while releasing the transmission element.

5. A Bowden cable adjusting device in accordance with claim 1, further comprising: a mounting tool for detaching the mounting securing means.

6. A Bowden cable adjusting device in accordance with claim 1, wherein said support element is arranged at a sleeve-shaped securing part with a passage opening for said transmission element and said support element wall blocking said passage opening with one or more said weakened areas of said wall.

7. A Bowden cable adjusting device in accordance with claim 6, wherein said securing part comprises a spring mount for a coil spring, said securing part being arranged in said housing.

8. A Bowden cable adjusting device in accordance with claim 1, wherein said housing has a clamping guide for said locking elements.

9. A Bowden cable adjusting device in accordance with claim 8, wherein said clamping guide has at least one conical wall at said housing and at least one wedge surface at said locking element, which generate a wedge effect directed towards said transmission element.

10. A Bowden cable adjusting device in accordance with claim 1, further comprising an adjusting element including a spring supported on a housing side, said adjusting element being arranged in said housing for said locking elements.

11. A Bowden cable adjusting device in accordance with claim 1, wherein said housing is connected on one side to an actuating member and has a passage opening for said transmission element as well as an adjusting space located on said inside on another, opposite side.

12. A Bowden cable adjusting device in accordance with claim 1, wherein said housing is open on a side and forms a cover for said locking means.

13. A Bowden cable adjusting device in accordance with claim 1, wherein said transmission element comprises a rod pulling element with at least one locking profile.

14. A Bowden cable adjusting device in accordance with claim 13, wherein said pulling element has on said front side a connection part for positive-locking meshing with a connection part at said support element.

15. A Bowden cable adjusting device in accordance with claim 13, wherein said pulling element is connected on said rear side in an articulated manner to a compensating element for a plurality of Bowden cables, forming a means securing against rotation.

16. A Bowden cable adjusting device for one or more Bowden cables, the device comprising:
    a transmission element for connection to the one or more Bowden cables;
    a housing with a detachable locking means for adjustably connecting the housing to said transmission element wherein said locking means has one or more locking elements with a locking profile movable in said housing against a restoring force, said locking elements being caused to mesh with a locking profile of said transmission element;
    a mounting securing means for mounting and securing the transmission element, said mounting securing means being arranged in said housing and supported by said housing, said mounting securing means having a support element for supporting said transmission element, said support element being provided with at least one predetermined breaking element comprising a wall with a weakened wall area that is weakened relative to an adjacent wall area, said mounting securing means being deactivatable while adjusting a distance between an actuating member and said one or more Bowden cables; and
    a mounting tool for detaching the mounting securing means, wherein said mounting tool comprises a mounting tool housing with a projecting pressure piston, which is guided in such a way that it can yield elastically.

17. A Bowden cable adjusting device in accordance with claim 16, further comprising an adjusting element including a spring supported in said housing, said adjusting element being arranged in said housing for adjusting said locking elements wherein said pressure piston is loaded in said push-out direction by a mounting tool spring, said mounting tool spring having a spring force stronger than a force of said adjusting element.

18. A Bowden cable arrangement comprising:
    one or more Bowden cables;
    an actuating member; and
    a Bowden cable adjusting device connected to said one or more Bowden cables and to said actuating member, said Bowden cable adjusting device comprising a transmission element for connection to the one or more Bowden cables, a housing with a detachable locking means for adjustably connecting the housing to said transmission element, wherein said locking means has one or more locking elements with a locking profile movable in said housing against a restoring force, said locking elements being caused to mesh with a locking profile of said transmission element and a mounting securing means for mounting and securing the transmission element, said mounting securing means being deactivatable, said mounting securing means being arranged in said housing and supported by said housing, said mounting securing means having a support element for supporting said transmission element, said support element being provided with at least one predetermined breaking element comprising a wall with a weakened wall area that is weakened relative to an adjacent wall area, wherein said weakened wall area comprises a groove to provide a groove region with reduced wall material compared to said adjacent wall area.

19. A Bowden cable arrangement in accordance with claim 18, wherein said actuating member is designed as a pivotable hand brake lever mounted on a mounting frame.

20. A Bowden cable arrangement in accordance with claim 19, further comprising: a mounting tool for detaching the mounting securing means, wherein said mounting frame has a support for said mounting tool.

\* \* \* \* \*